US009366519B2

(12) United States Patent
Danbury et al.

(10) Patent No.: US 9,366,519 B2
(45) Date of Patent: Jun. 14, 2016

(54) MEASUREMENT METHOD

(71) Applicant: RENISHAW PLC, Wotton-under-Edge, Gloucestershire (GB)

(72) Inventors: Richard Neil Danbury, Compton Martin (GB); David Sven Wallace, Nympsfield (GB)

(73) Assignee: RENISHAW PLC, Wotton-Under-Edge (GB)

(*) Notice: Subject to any disclaimer, the term of this patent is extended or adjusted under 35 U.S.C. 154(b) by 255 days.

(21) Appl. No.: 14/350,264

(22) PCT Filed: Oct. 3, 2012

(86) PCT No.: PCT/GB2012/000761
§ 371 (c)(1),
(2) Date: Apr. 7, 2014

(87) PCT Pub. No.: WO2013/050729
PCT Pub. Date: Apr. 11, 2013

(65) Prior Publication Data
US 2014/0215841 A1   Aug. 7, 2014

(30) Foreign Application Priority Data

Oct. 6, 2011   (EP) .................................. 11250839

(51) Int. Cl.
*G01B 5/008*   (2006.01)
*G01B 5/20*   (2006.01)

(52) U.S. Cl.
CPC ................ *G01B 5/008* (2013.01); *G01B 5/205* (2013.01)

(58) Field of Classification Search
CPC .................................. G01B 5/008; G01B 5/205
USPC .......................... 33/503, 551, 553, 554, 555
See application file for complete search history.

(56) References Cited

U.S. PATENT DOCUMENTS 3,318,009 A * 5/1967 Tishler .................. G01B 5/205
                                                    33/547
4,043,046 A   8/1977 Thomas
4,166,323 A * 9/1979 Maag ..................... G01B 7/283
                                                    33/501.9

(Continued)

FOREIGN PATENT DOCUMENTS

CN   1894556 A     1/2007
CN   101166950 A   4/2008
CN   101432592 A   5/2009

OTHER PUBLICATIONS

Sep. 28, 2015 Office Action issued in Chinese Patent Application No. 201280049195.8.

(Continued)

*Primary Examiner* — Christopher Fulton
(74) *Attorney, Agent, or Firm* — Oliff PLC

(57) ABSTRACT

A method of locating a feature of an object in which the method includes bringing a stylus of a contact probe mounted on a positioning apparatus into contact with the object to obtain at least first and second measurements of the object. Each which the measurements gives rise to a range of possible points of contact between the object and a part of the stylus along its length and therefore inherently containing uncertainty in the location of the object along said length. The at least first and second measurements are used to reduce the extent of said uncertainty which includes using stylus orientation related information associated with the at least first and second measurements.

16 Claims, 11 Drawing Sheets

(56) References Cited

U.S. PATENT DOCUMENTS

| | | | | |
|---|---|---|---|---|
| 4,612,622 | A * | 9/1986 | May | G01B 5/012 33/501 |
| 4,901,256 | A * | 2/1990 | McMurtry | G01B 7/28 33/503 |
| 5,189,806 | A * | 3/1993 | McMurtry | G01B 21/04 33/503 |
| 5,510,977 | A | 4/1996 | Raab | |
| 6,014,816 | A | 1/2000 | Matsumiya et al. | |
| 6,460,261 | B1 * | 10/2002 | Noda | G01B 5/241 33/199 R |
| 7,165,335 | B2 * | 1/2007 | McMurtry | G01B 5/004 33/503 |
| 7,318,284 | B2 | 1/2008 | McMurtry et al. | |
| 7,392,692 | B2 * | 7/2008 | Noda | G01B 5/008 33/503 |
| 7,809,523 | B2 * | 10/2010 | Hunter | G01B 21/04 33/503 |
| 7,849,605 | B2 * | 12/2010 | Spaan | G01B 21/042 33/502 |
| 7,900,367 | B2 | 3/2011 | Sutherland | |
| 7,908,759 | B2 | 3/2011 | McLean et al. | |
| 9,103,648 | B2 * | 8/2015 | Noda | G01B 21/04 |
| 2010/0132432 | A1 | 6/2010 | Wallace et al. | |
| 2011/0184695 | A1 * | 7/2011 | Grzesiak | G01B 5/008 702/167 |
| 2015/0121710 | A1 * | 5/2015 | McMurtry | G01B 21/045 33/503 |

OTHER PUBLICATIONS

"MODUS 1.3 Edge Points," pp. 1-15, Renishaw Software, Oct. 1, 2010.

"Metrology Handbook: The science of measurement". 228-229, 2007, Mitutoyo (UK) Ltd.

European Search Report issued in European Application No. 11 25 0839 dated Mar. 2, 2012.

International Search Report issued in International Application No. PCT/GB2012/000761 dated Nov. 28, 2012.

Written Opinion of the International Searching Authority issued in International Application No. PCT/GB2012/000761 dated Nov. 28, 2012.

\* cited by examiner

▭ Expected shape
▨ Measured shape

MEASUREMENT METHOD

This invention relates to a method of measuring a feature of an object, in particular for measuring an elongate edge of an object.

During measurement of a feature of an object it can be advantageous to firstly identify the position of the feature before an accurate measurement of the object is performed. For instance, this can be the case when measuring the edge of an object, such as the edge of a blade on a turbine blisk used in a jet engine. Such blades can be measured using, for instance, an analogue probe mounted on a CMM as for instance illustrated in FIG. 1. The analogue probe can be driven under the control of the CMM (which has a data model of the expected blisk shape) so that its stylus tip is brought into contact with the blade's edge and scanned along it to obtain measurement data. However, the edge of such a blade can be as small as a few millimeters thick and if it is out of position by just a millimeter or two then the stylus tip can clash with and/or drop off the blade edge causing erroneous measurement. In particular, during the scanning of a blade edge, it is important that the stylus tip is driven into the blade surface in a direction normal to the surface, or at least as normal to the surface as possible. If it isn't then the stylus tip can slip along the surface, thereby compromising the measurement of the blade.

Currently, the edge of the blade is found by bringing the stylus tip into contact at a plurality of points around the section of the edge that is to be measured. For instance, the stylus tip may be used to take three point measurements, one on each side of the edge and then one on top of the edge. Once this has been performed the edge can be scanned by the tip across its apex, i.e. from one side to the other. The steps of edge finding by taking three point measurements and then scanning across the apex is then repeated a plurality of times at different locations along the length of the edge.

It is known to measure the diameter of a hole in sheet metal by using the elongate side of a stylus tip to contact the inner edge of the hole. The position of the hole/sheet in the dimension perpendicular to the hole's is then found by using the end of the stylus tip to take a point measurement of the face of the sheet in which the hole is located.

It is also known to measure the location of a straight side of an object, e.g. a face by taking at least two point measurements. The centre point of the stylus tip is recorded at the two points of contact. Before applying an offset to compensate for the radius of the tip, the relative positions of the points of contact are determined which enables the offset to be applied in a direction normal to the measured surface, thereby enabling a more accurate determination of the location of the surface.

The present invention provides a method of quickly locating an object using a contact probe, in which at least a first measurement is taken that comprises a range of possible points of contact (and therefore inherently contains uncertainty in the location of the object along said length of range of possible points of contact), and in which a different second measurement also comprising a range of possible points of contact is used to reduce the extent of (e.g. at least partially resolve) said uncertainty.

For example, the present invention provides a method of quickly locating an edge of an object using a contact probe by taking different series of measurements along at least part of the edge, and then using the two series of measurements to locate the edge.

According to a first aspect of the invention, there is provided a method of locating a feature of an object comprising: bringing a length of the stylus of a contact probe mounted on a positioning apparatus into contact with the object to obtain at least first and second measurements of the object, each of which gives rise to a range of possible points of contact between the object and a part of the stylus along its length and therefore inherently containing uncertainty in the location of the actual point of contact between the object and stylus along said length, and using the at least first and second measurements to at least reduce the extent of (e.g. partially resolve) said uncertainty comprising using stylus orientation related information associated with (e.g. recorded as part of) the at least first and second measurements.

The general location of the feature (for example an edge) of the object can be determined more quickly using the method of the invention compared to the above described known technique. For instance, those two measurements can be taken more roughly in the sense that the exact point of contact between the edge and the stylus along its length is unimportant, e.g. the fact the measurements give rise to a range of possible points of contact is unimportant as this is later resolved using the known associated stylus orientation related information. This is unlike the prior known methods where it is important that the probe is carefully and accurately controlled such that the stylus tip is brought into contact with the object for at least one measurement. In particular, because the stylus orientation related information is known and can be used, it means that the orientation, shape and/or dimensions of the stylus can be taken into consideration when resolving the uncertainty. This can mean that more than just the position of the stylus tip, at the point of contact can be used to identify the location of the edge. For instance, the shaft itself could be taken into consideration. Indeed, the range of possible points of contact could extend at least part way along the length of the stylus shaft. Optionally, non-spherical stylus tips could be used and knowledge of its orientation at the point of measurement used. Furthermore, the first and second measurements can be obtained using an only partially calibrated or non-calibrated part of the probe.

In particular, the method of the invention enables the location of a feature, the position of which in at least one dimension is unknown to a certain extent, to be quickly and efficiently found by using a length of stylus that is greater than the uncertainty of the position of the feature of the object. It doesn't matter where along the length of the stylus contact is made in each of the first and second measurements, and indeed taken individually it won't be known where contact is made. However, using the known orientation related information associated with the first and second measurements, the location of the object can be determined using the at least first and second measurements.

Reducing the extent of uncertainty (e.g. resolving said uncertainty) can comprise determining the actual point of contact between the stylus and object for at least one of the first and second measurements. However, this need not necessarily be the case and, for instance, reducing the extent of uncertainty can comprise determining the position of the feature in the positioning machine's measurement volume.

If a more precise measurement of the feature is required, then the location of the feature determined from the at least first and second measurements can be used to guide a measurement probe so as to more precisely measure the feature. Indeed, the determined location can then be used so as to guide a (for example, calibrated) probe to accurately measure the feature without clashing with, or dropping off, the feature during a subsequent measurement, as described in more detail below. In particular, it can be used to ensure that during a subsequent measurement, the probe is driven into the object in a direction substantially normal to the surface of the object.

As will be understood, the known stylus orientation related information could take many different forms. For instance, it could comprise data concerning the angle of the stylus about at least one axis, preferably about at least two axes, in the positioning machine's measurement volume at the point of measurement. Stylus orientation related information could comprise stylus tip point data and vector data describing the direction of the stylus at the point of measurement. Stylus orientation related information could comprise data describing the position and orientation of the stylus centre line at the point of measurement. As will be understood it need not necessarily be angular data/pure orientation information, but could merely be information related to the orientation of the stylus. For example, the data could comprise a point cloud data set, function or the like describing the outer volume of at least a part of the stylus, or even the centre-line of the stylus. Accordingly, stylus orientation related information could comprise data describing at least part of the volume or outer shape and position of the stylus at an instance of contact with the object. As will be understood, in this case it can be important to know the shape of the stylus, along the length of the range of possible points of contact.

The stylus orientation related information can be associated with the at least first and second measurements in that the orientation related information when the at least first and second measurements were obtained is known and/or can be deduced. The stylus orientation related information can be recorded as part of the at least first and second measurements. As will be understood, this information could be recorded before, after, during/at the event of the at least first and second measurements being obtained. For instance, in the case of a probe which is mounted on a fixed probe head (e.g. in which its orientation cannot be changed, such as when it is mounted directly onto the quill of a coordinate positioning apparatus) then the orientation related information can be known from the knowledge of the orientation that the probe is mounted onto the coordinate positioning apparatus. In the case of the probe being mounted onto an indexing probe head (i.e. in which the orientation of the probe can be altered by discrete fixed amounts and/or can be locked into position whilst measurements are being obtained), then the orientation related information also need not necessarily be recorded at the instant the at least first and second measurements are taken, but instead can be known from knowing the position the head was locked into at the time the measurements were taken. In the case of analogue heads in which the angle of the head and hence the orientation of the stylus can be changed during the obtaining of the at least first and second measurements, then the stylus orientation related information can be known by measuring the head angles whilst the first and second measurements are obtained and recording them or related stylus orientation information.

Different probes can be used to obtain the first and second measurements. Preferably, the contact probe used to take the second measurement is the same as that used to obtain the first measurement.

The relative angular orientation between the stylus and the object can be the same for the first and second measurements. In this case, the stylus and object can be translated relative to each other between the first and second measurements. For instance, this could be achieved when the surface for contacting the object has non-parallel sides, e.g. is conical in shape. Optionally, the relative angular orientation between the stylus and the object is different for the first and second measurements.

As will be understood, the contact probe and/or object can be mounted on a positioning apparatus, such as a coordinate positioning apparatus. For example, the contact probe and/or object could be mounted on a coordinate measuring machine (CMM), machine tool, robot arm or the like. As will be understood, the contact probe could be configured to move relative to the object, vice versa, or both could be configured to be moved relative to each other. For instance, the contact probe could be mounted on a quill of a coordinate positioning machine that can move in at least one degree of freedom (e.g. a linear degree of freedom), optionally at least two degrees of freedom (e.g. two orthogonal linear degrees of freedom) and further optionally at least three degrees of freedom (e.g. three orthogonal linear degrees of freedom). The contact probe could be mounted on the quill directly, or for instance via an articulated head, for example as described below.

The contact probe (and/or the object) can be mounted on an arm (e.g. an articulated head) which facilitates rotation of the contact probe about at least one axis, optionally at least two axes, for instance at least three axes. Accordingly, the stylus orientation related information could comprise the angle of the stylus about the at least one axis, optionally at least two axes, for instance at least three axes. The first and at least second axes (and optionally at least third axes) can be substantially orthogonal to each other. As will be understood, the arm can comprise at least one drive for positioning the contact probe (and/or object) about at least one rotational axis. The arm could be "indexing" (in which the head's motor(s) is used to move the inspection device between a plurality of predetermined, or "indexed", orientations) or can be "active" or "servoing" (in which the arm's motor(s) is constantly servoed in order to control the orientation of the contact probe, e.g. either to hold the orientation of the contact probe or to change the orientation of the contact probe, for instance whilst measurements are taken).

The stylus can comprise a stylus shaft and a stylus tip. The stylus shaft spaces the stylus tip away from a body of the contact probe. The body can have features for enabling it to be connected to a CMM (for instance the head or quill of the CMM). Typically, stylus shafts are elongate so as to space the stylus tip away from the probe's body. Typically, stylus shafts are at least twice as long as the length of the stylus tip (taken in a common dimension). For example, if the stylus tip is spherical, the length of the stylus shaft can be at least twice as large as the stylus tip's diameter. Typically stylus tips are substantially spherical in shape, although as will be understood this need not be the case. For instance, styli with elongate stylus tips, for example substantially cylindrical, are known. The invention can be implemented by taking the first and/or second measurements using the stylus tip. This is especially the case if the stylus tip is elongate. Typically, stylus tips are calibrated so as to determine their dimension and position whereas stylus shafts are not.

Preferably, the method comprises taking the first and/or second measurement(s) using the stylus shaft. In other words, the first and/or second measurement(s) can be obtained via contact between the object and the stylus shaft.

At least a part of the stylus can be cylindrical. For example, at least a part of the stylus shaft is cylindrical. Optionally, the stylus tip could be cylindrical. In this case, taking at least one of the first and second measurements can comprise bringing the cylindrical part of the stylus into contact with the object. For example, it can comprise bringing a cylindrical part of the stylus shaft into contact with the object.

The contact probe can be a touch trigger probe. As will be understood, such probes issue a signal when contact between the probe (e.g. its stylus) and object is detected. Optionally, the contact probe can be an analogue scanning probe. As will be understood, such probes can provide a measure of the extent of deflection of, for instance the probe's stylus, relative to the probe body.

Obtaining at least one of the first and second measurements can comprise bringing the contact probe into contact with the object at a plurality of discrete points along the length of the object. For instance, this could particularly be the case when the contact probe is a touch-trigger probe, but as will be understood this technique could also be used when the contact probe is an analogue scanning probe.

Optionally, at least one of said first and second measurements can be obtained by scanning the contact probe along the length of object.

The method can comprise subsequently using said identified location of the feature of the object to guide the subsequent measurement of at least a part of the feature with a measurement probe. In the case of the feature being an edge of the object, the subsequent measurement of at least a part of the feature can comprise taking measurements on both sides of the edge's apex at least at one point along the length of the edge, and optionally at a plurality of points. The subsequent measurement can comprise sweeping across the edge's apex at least at one point along the length of the edge, and optionally at a plurality of different points along the length of the object. The subsequent measurement can comprise sweeping back and forth across the edge's apex whilst travelling along the length of the edge.

The stylus tip of a contact probe could be used to contact the object in the subsequent measurement of the at least part of the feature.

The probe used to subsequently measure the at least part of the feature can be the same contact probe used to obtain at least one of the first and second measurements.

Optionally, the at least first and second measurements are obtained on the same side of the feature (for example the same side of the edge's apex). Preferably, at least one measurement (e.g. the first measurement) is taken on a first side of the feature, and at least one other measurement (e.g. the second measurement) is taken on a second side of the feature.

The method can comprise obtaining a first series of measurements on a first side of the feature. The method can comprise obtaining a second series of measurements on a second side of the feature. The first and second series of measurements can at least partially overlap along the length of the feature.

The at least first and second measurements can be used to reduce the extent of uncertainty, which can comprise using the stylus orientation related information associated with (e.g. recorded as part of) the at least first and second measurements.

At least partially resolving said uncertainty can comprise fitting nominal model data to data obtained from said first and second measurements. For example, the first and second measurements can intersect. The first and second series of measurements can intersect with each other at the points they overlap along the length of the feature. At least partially resolving said uncertainty can comprise using any such intersection, e.g. so as to identify the location of at least part of the feature. For instance, a line of intersection between the first and second series of measurements can be determined. This line of intersection can be used to identify the location of the at least part of the feature. For example, this can comprise applying an offset to the line of intersection to locate the approximate position of at least part of the feature. The offset can be predetermined, for instance predetermined based on the ideal object and knowledge of the shape and dimensions of the contact probe.

Reducing the extent of uncertainty/at least partially resolving said uncertainty could also comprise using nominal model data regarding the shape and/or dimensions of the object. For example, this could comprise fitting, e.g. best-fitting, nominal model data regarding the shape and/or dimensions of the object to data obtained from the at least first and second measurements.

Reducing the extent of uncertainty/at least partially resolving said uncertainty could comprise using the first and second measurements to refine the range of possible points of contact for the at least first and second measurements down to a range of valid points of contact. As will be understood, when the at least first and second measurements are considered together/in combination it can easily be seen that some of the possible points of contact of the first measurement are in fact not valid in that the stylus could not have contacted the feature at those points as otherwise it wouldn't have been possible to obtain the second measurement, and vice versa. This is especially the case for at least first and second measurements which intersect, and further especially the case for measurements taken in the same plane. Accordingly, the determination of a range of valid points of contact can be based on the locations (s) at which the at least first and second measurements intersect and optionally the direction in which the measurement was taken. The method can comprise locating and/or determining the shape and/or dimensions of at least a section (e.g. a cross-section) of the feature based on the determined valid range of points of contact. For example, the location, shape and/or dimension of the information could be based on the boundary, or outline, delineated by the range of valid points of contact. Accordingly, a computer model of the feature could be generated based on said range of valid points of contact, and for instance could conform to the shape/dimensions of the boundary, or outline, delineated by the valid points of contact.

The first and/or second series of measurements can each define a region, the intersection of which is used to identify the location of said at least part of the feature. For instance, if the edge is straight, then the first and second series of measurements can each define a plane, the intersection of which is used to identify the location of said at least part of the feature. The first and/or second series of measurements can each define a volume, the intersection of which is used to identify the location of said at least part of the feature. In particular, the line of intersection closest to the edge can be used to identify the location of at least part of the feature. Optionally, as will be understood, the feature can be located using the intersection between a first series of measurements which define a region and a second series of measurements that define a volume.

The object can be a blade. Optionally, the blade is the blade of a blisk, such as those used in turbine engines, for example for aircraft.

Of course, more than two measurements could be taken. For instance, the method could comprise obtaining at least a third measurement which also gives rise to a range of possible points of contact between the object and a part of the stylus along its length. In this case, any combination of the first, second and at least third measurements could be used to reduce the extent of the uncertainty.

Likewise, more than two series of measurements could be taken. For instance, the method could comprise obtaining at least a third series of measurements which differs to the first and/or second series of measurements. In the case of the feature being an edge, the third series of measurements can comprise, for a plurality of positions alongside the edge's apex, a range of possible points of contact between the object and a contact probe. In this case, any combination of the first, second and at least third series of measurements could be used so as to identify the location of said at least part of the edge.

Accordingly, this specification describes a method of locating a feature of an object using contact probe having a stylus shaft and a stylus tip in which the method comprises bringing the stylus shaft into contact with the object so as to obtain at least one measurement. This can then comprise further measuring the feature of the object using the stylus tip of a contact probe. The measurement obtained using the stylus tip can be a more accurate measurement than that obtained by using the stylus shaft. The step of locating the feature using the stylus shaft can comprise scanning the stylus shaft along the feature so as to obtain a series of measurements using the stylus shaft.

In particular this specification describes a method of locating an object using a contact probe, which comprises taking at least a first measurement comprising a range of possible points of contact, and therefore inherently containing uncertainty in the location of the object along said length of range of possible points of contact, the method further comprising using a different second measurement also comprising a range of possible points of contact to reduce the extent of (e.g. at least partially resolve) said uncertainty.

Also described is a method for measuring an edge of an object, comprising: taking a first series of measurements with a contact probe, said first series of measurements comprising, for a plurality of positions alongside the edge's apex, a range of possible points of contact between the object and a contact probe. The method also comprises taking a second series of measurements with a contact probe, which differs to but at least partially overlaps with the first series of measurements along the length of the edge, said second series of measurements also comprising, for a plurality of positions alongside the edge's apex, a range of possible points of contact between the object and a contact probe. The first and second series of measurements can then be used to identify the location of at least part of the edge.

As will also be clear, what is also described is a method for measuring an edge of an object, comprising: taking a first series of measurements with a contact probe, said first series of measurements comprising, for a plurality of positions alongside the edge's apex, a range of possible points of contact between the object and a contact probe; taking a second series of measurements with a contact probe, which differs to and intersects the first series of measurements, said second series of measurements comprising, for a plurality of positions alongside the edge's apex, a range of possible points of contact between the object and a contact probe; using the first and second series of measurements to identify the location of at least part of the edge.

According to a second aspect of the invention there is provided a computer program code comprising instructions which when executed by a computer of a coordinate positioning apparatus causes the coordinate positioning apparatus to execute any of above described methods.

According to a third aspect of the invention there is provided a computer readable medium comprising computer program code as described above.

Embodiments of the invention will now be described, by way of example only, with reference to the accompanying drawings, in which.

Figure 1:
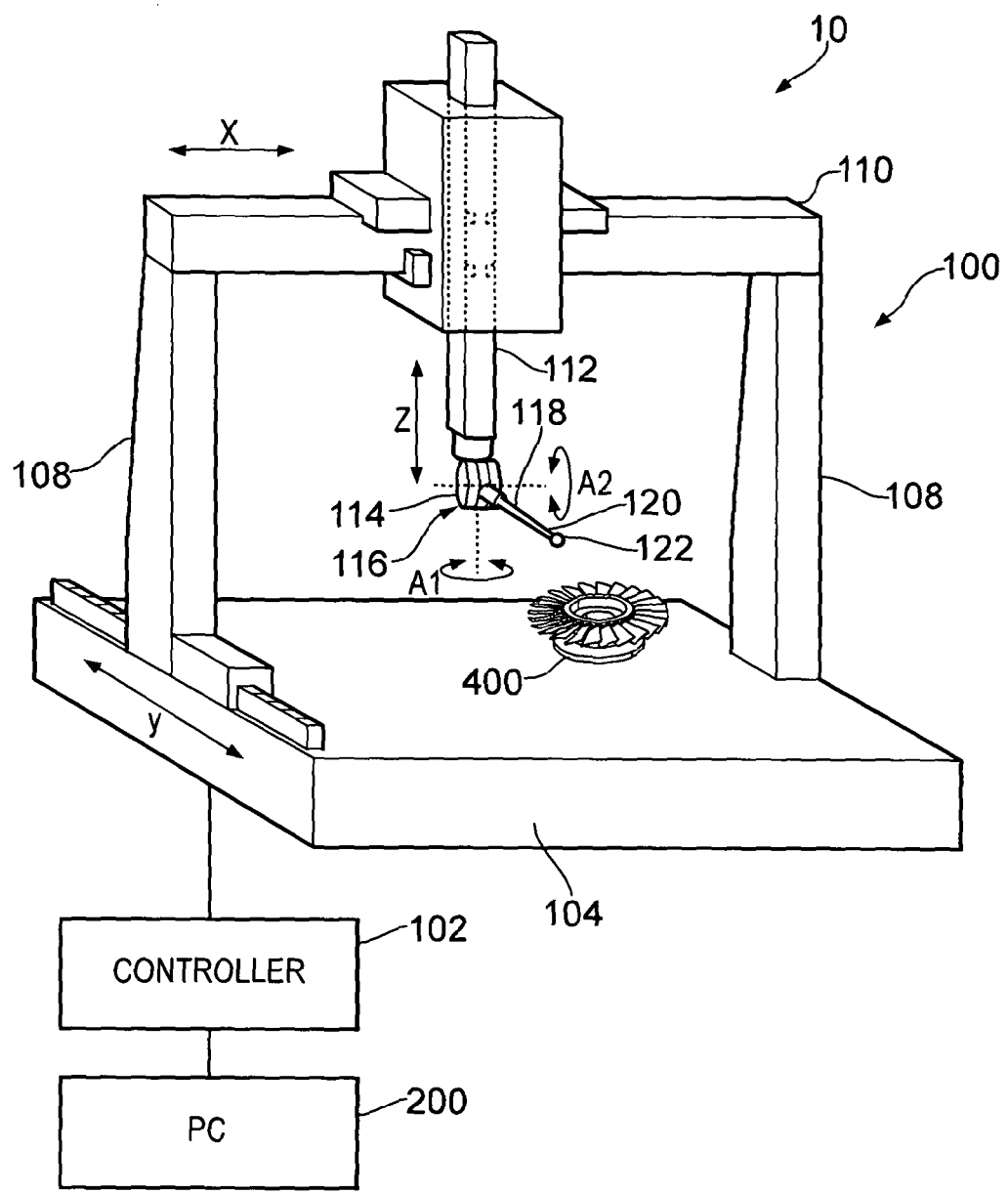
FIG. 1 illustrates a coordinate positioning apparatus configured to operate in accordance with the method of the invention.
Figure 5:
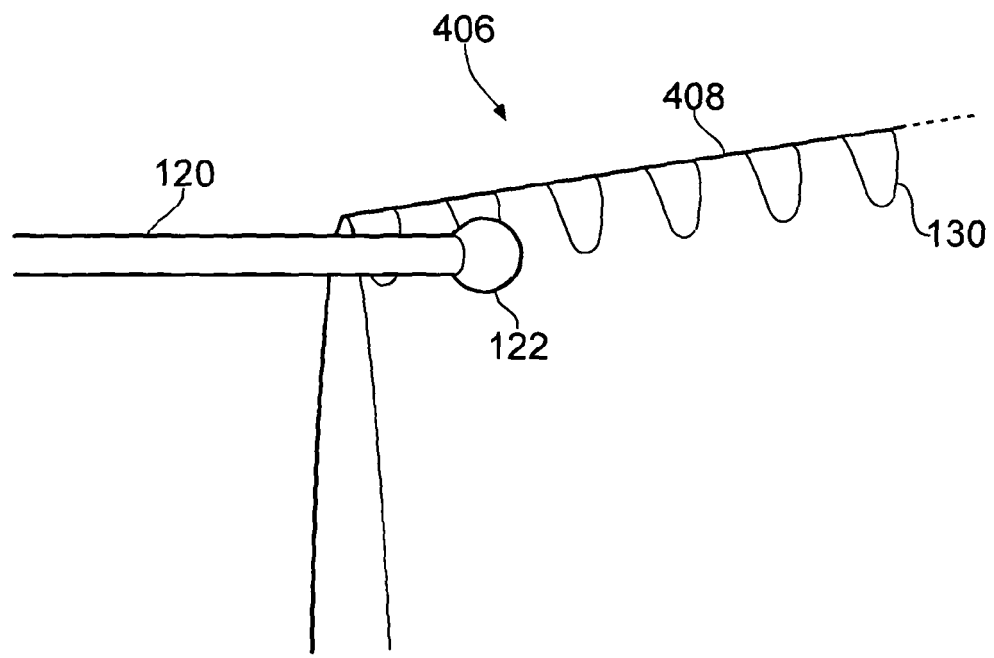
Figure 7:
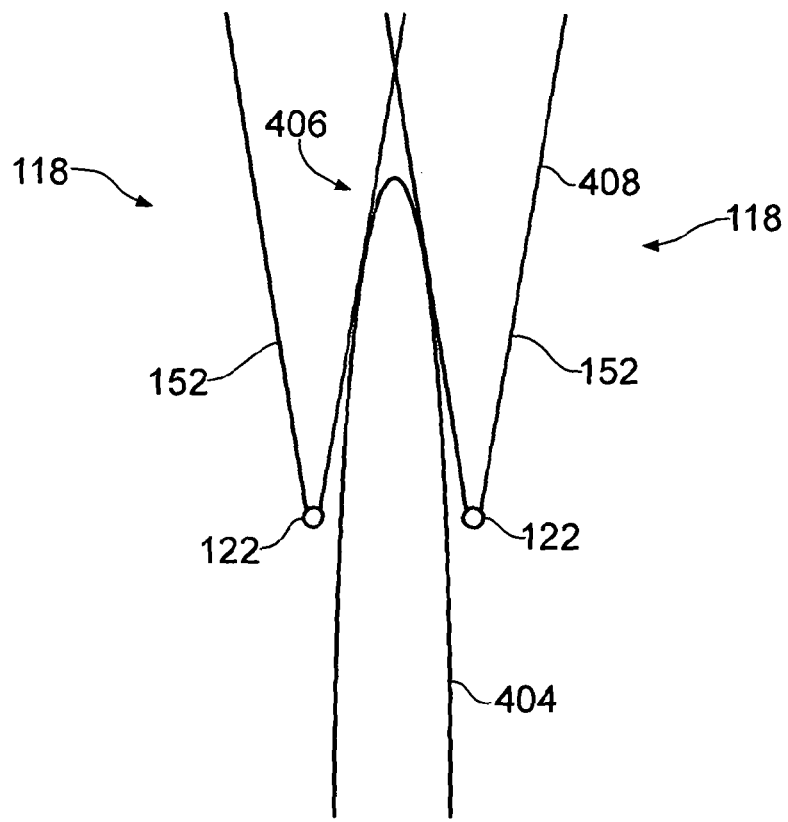
Figure 6A:
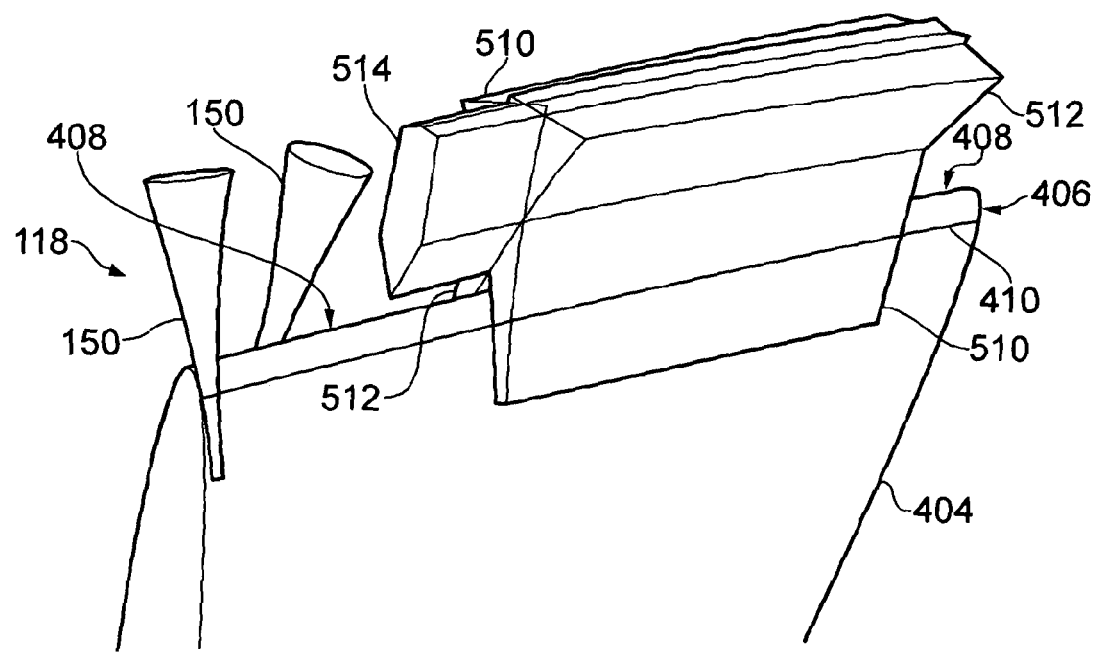
Figure 6B:
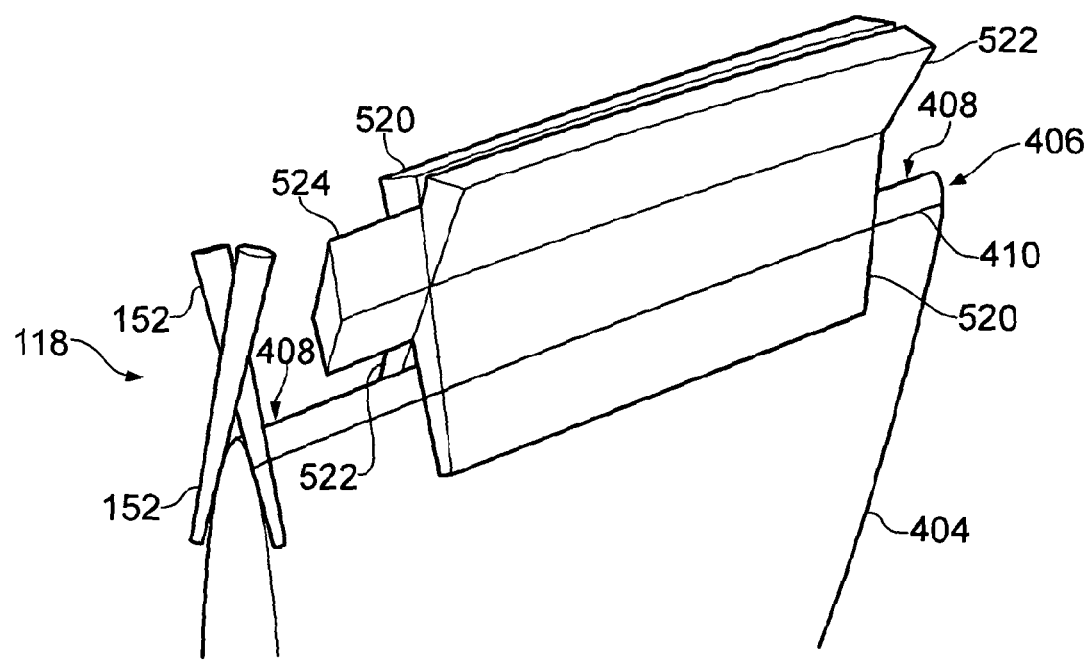
Figure 12A:
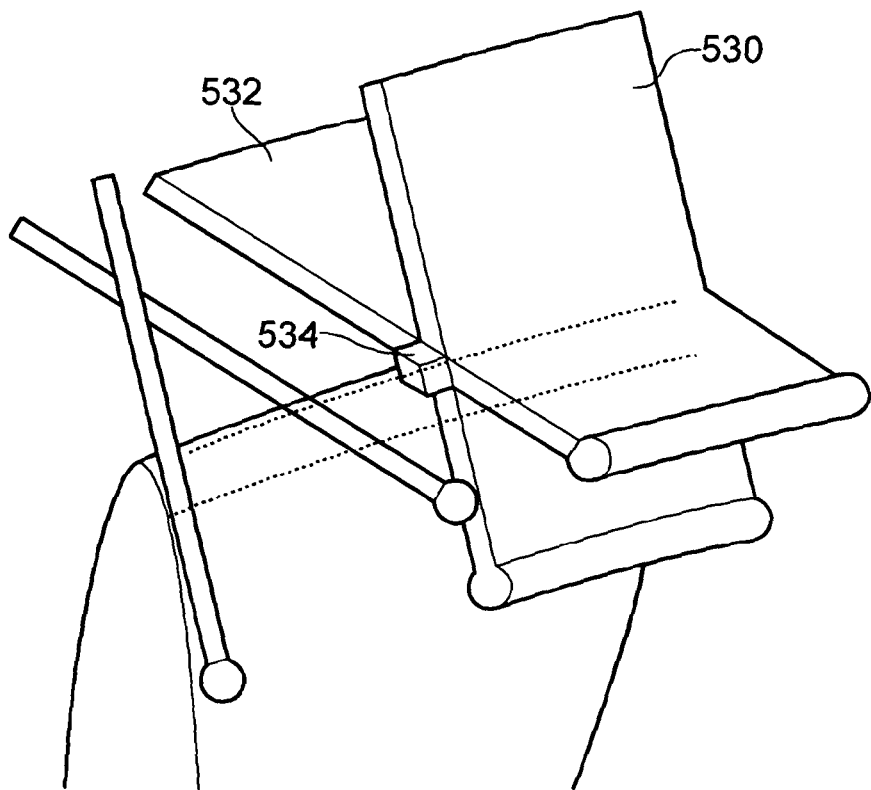
Figure 12B:
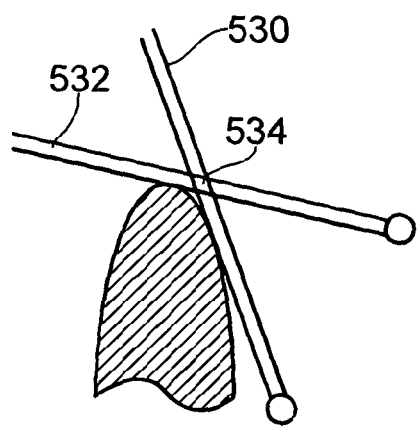
Figure 13:
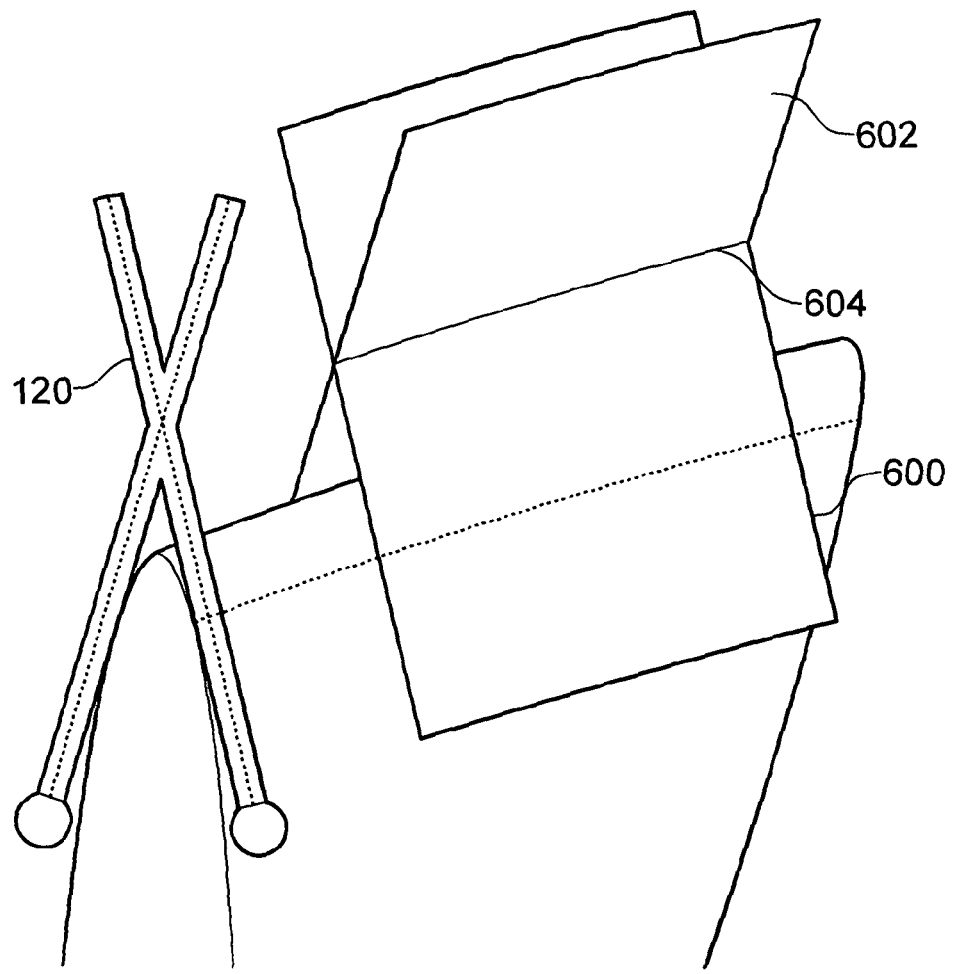
Figure 14:
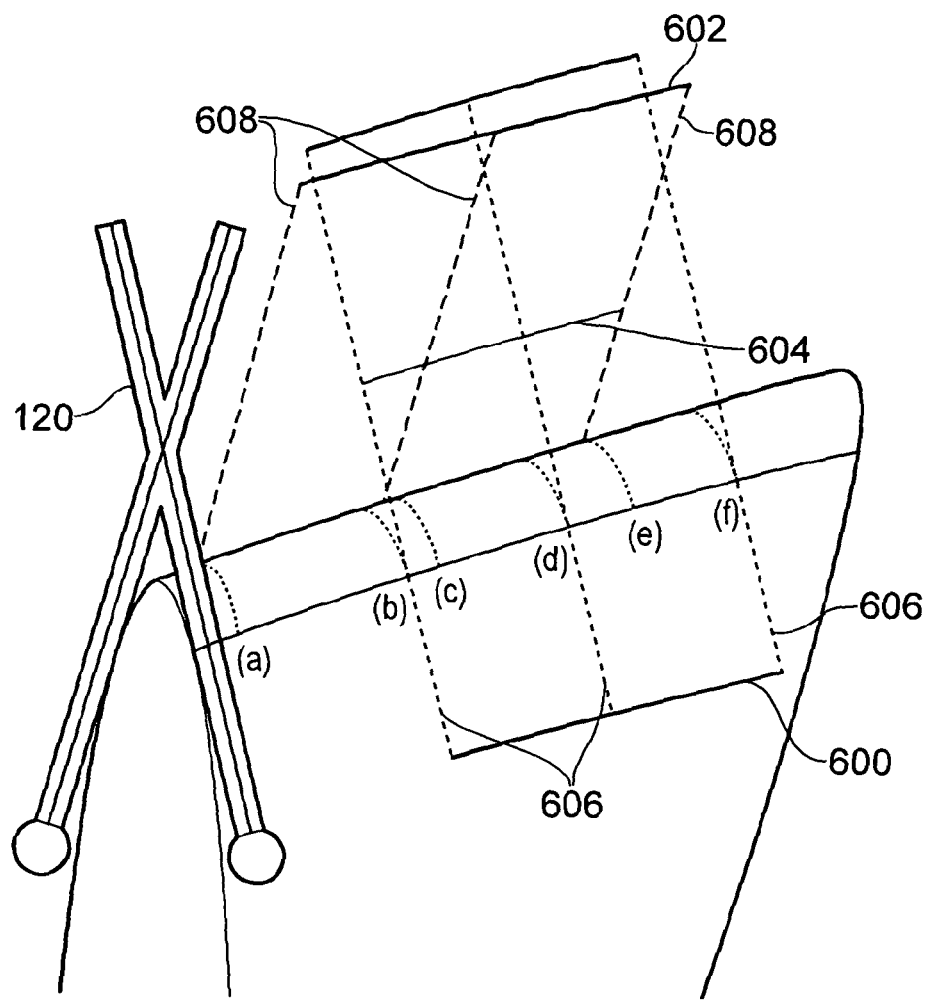
Figure 15A:
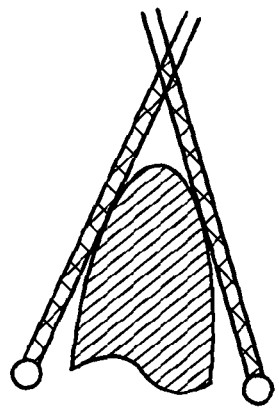
Figure 15B:
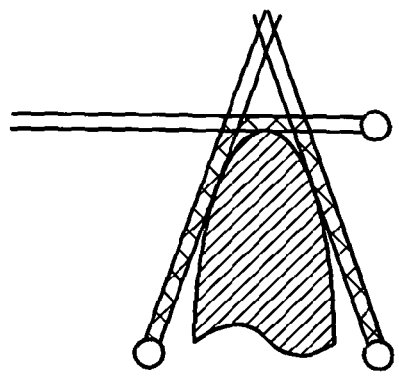
Figure 15C:
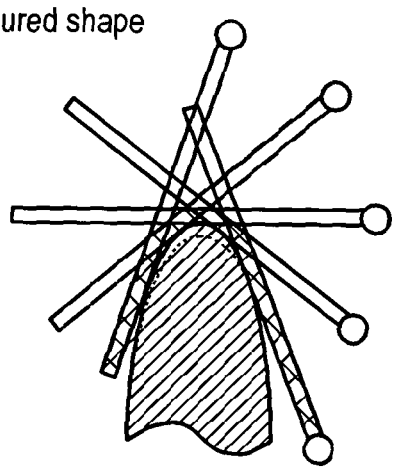

FIG. 5 schematically illustrates the path of a stylus tip during scanning of an edge of a blade;

FIGS. 6a and 6b are schematic illustrations of first and second series of measurements obtained via the method of the invention using a stylus with a trumpet and conical-shaped shaft respectively;

FIG. 7 is a schematic illustration of a further embodiment of the invention in which the same relative orientation of the stylus and object being measured is maintained between obtaining the first and second series of measurements;

FIGS. 8 to 11 illustrate how the edge of the blade is found from the intersection of the first and second measurements;

FIGS. 12a and 12b are a schematic isometric and end illustrations of an embodiment of the invention in which the first and second series of measurements are obtained in the same side of the edge's apex;

FIG. 13 is a schematic illustration of an embodiment of the invention in which the series of measurements comprise a "ribbon" or a "band" of measurement points;

FIG. 14 is a schematic illustration of an embodiment in which the first and second series of intersecting measurement comprise discrete measurements along the length of the edge;

FIGS. 15a and 15b illustrate how that the location of an edge of a blade can be determined by best-fitting techniques; and FIG. 15(c) illustrates a method of measuring the blade by scanning a probe along its length multiple times at different angular orientation Referring to FIG. 1, there is shown a coordinate positioning apparatus 10 according to an embodiment of the invention, comprising a coordinate positioning machine in the form of a coordinate measuring machine ("CMM") 100, a desktop computer 200 and a controller 102. The CMM 100 comprises a platform 104 onto which an object, in this case a blisk 400, to be inspected can be placed, and a gantry comprising two upright members 108 and a cross-member 110 extending between the two upright members 108. The gantry can be moved along the platform in one linear dimension (in this case the labelled the "y" axis) via motors (not shown) under the control of the controller 102. The cross-member 110 carries a quill 112 which can be moved along the length of the cross-member (in this case labelled the "x" axis) and also perpendicularly to the y and x axes (i.e. along the "z" axis as shown) via motors (not shown) under the control of the controller 102. The quill 112 carries a head 114 which in turn carries a probe 116 which has a stylus 118, comprising an elongate stylus shaft 120 and a stylus tip 122. In the described embodiment, and as is typically the case, the stylus tip 122 has been calibrated (using, for example, a calibration artifact) such that its dimensions and location relative to defined point on the CMM (e.g. the head 114) is accurately known. The shaft 120 is not calibrated, but as explained in more detail below, its approximate dimensions are known. The head 114 is articulated in that it has bearings and motors (not shown) that facilitate rotation of the probe 116 and hence stylus 118 about first and second orthogonal axes (shown as "A1" and "A2" in FIG. 1) under the control of the controller 102. The CMM comprises position encoders (not shown) which report the position of the gantry, the quill 112 and the probe 116 in each of the three linear and two rotational degrees of freedom to the controller 102, thereby enabling the position of the probe's tip 122 to be determined.

In the embodiment described, the probe 116 is a contact analogue probe (also known as a scanning probe) which detects and reports the extent of deflection of the stylus from its rest position. As will be understood, the probe 116 need not necessarily be an analogue probe. For instance, it could be a touch-trigger probe which issues a signal when contact is detected between the probe 116 (and in particular the stylus 118 (and more particularly the stylus tip)) and the object 106. However, as will be understood, in the described embodiment an analogue probe is advantageous because it enables a series of measurements along the length of the edge to be obtained quickly, simply by scanning the analogue probe stylus along the edge.

Figure 2:
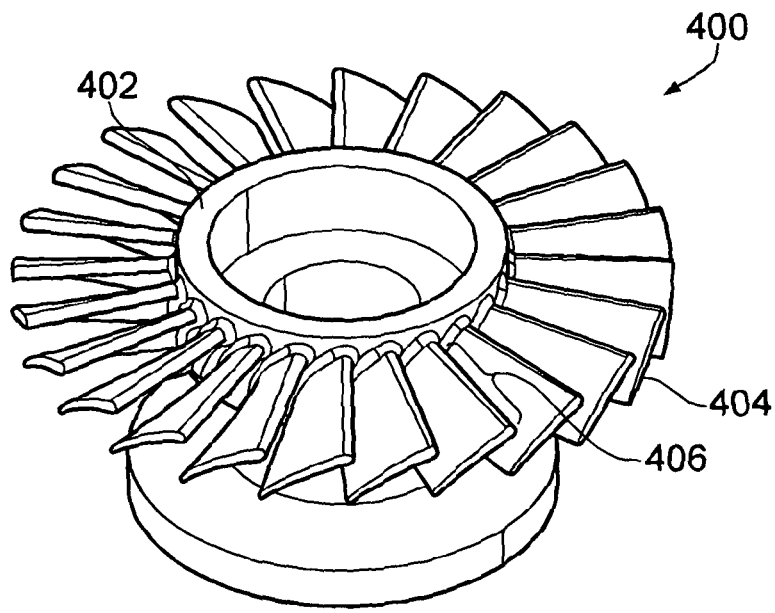
FIG. 2 illustrates a blisk which can be measured according to the method of the present invention.

FIG. 2 shows the blisk 400 in more detail. As will be understood, such blisks are commonly used in turbine engines. As can be seen, the blisk comprises a central hub 402, from which a plurality of blades 404 extend radially. Typically, these blades 404 are welded to the central hub 402 during manufacture. It is of utmost importance that the blades 404 are correctly positioned to ensure safe and efficient operation. In particular, it has been found that the position, orientation, size and/or form of the leading edge 406 of the blades 404 is critical. It is therefore important that an accurate measurement of the leading edge of the blades 404 is performed. Of course, the method is equally applicable to the measurement of trailing edges on a blade, or indeed the edge (s) of any other type of object. Current techniques involve scanning the edge of the blade 404 with an analogue probe, which can involve sweeping the stylus tip 122 back and forth across the apex 408 of the edge as the stylus tip 122 is moved along the length of the edge 406 (as illustrated by the stylus tip path 130 in FIG. 5). Alternatively, the edge can be measured by taking a number of measurements of the edge (by sweeping the probe across the blade) at discrete locations along the length of the blade's edge. In order to do these types of measurements it is necessary to know the approximate location of the edge in order to control the motion of the stylus tip 122 across (and optionally along) the edge. However, it has also been found particularly difficult to measure such edges of the blades accurately. This is because, due to manufacturing tolerances, the location of the blade's edge often diverges from its expected location as you travel away from the central hub 402. This causes the stylus tip 122 to slip off and/or crash with the blade edge.

Figure 3:
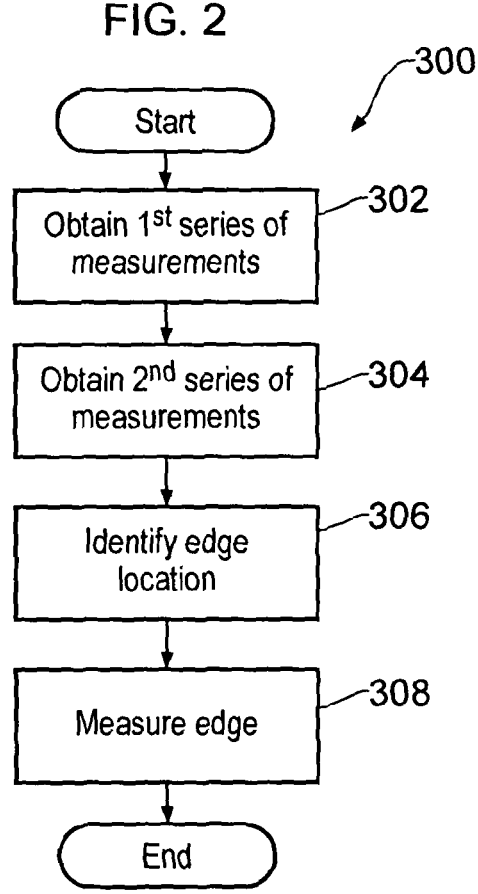
FIG. 3 is a flow-chart showing the steps involved in measuring an edge in accordance with one embodiment of the invention.

The present invention provides a quick and efficient way of locating the blade edge 406 for example so as to aid subsequent scanning of the edge 406. As illustrated in FIG. 3, this generally involves at step 302 obtaining a first series of measurements along the length of the blade edge 406, at step 304 obtaining a second series of measurements along the length of the blade edge 406, and at step 306, identifying the edge's 406 location using the first and second series of measurements. Once the edge has been located using the method of the invention, then the edge 406 can be measured at step 308 as described above and as shown in FIG. 5.

Figure 4:
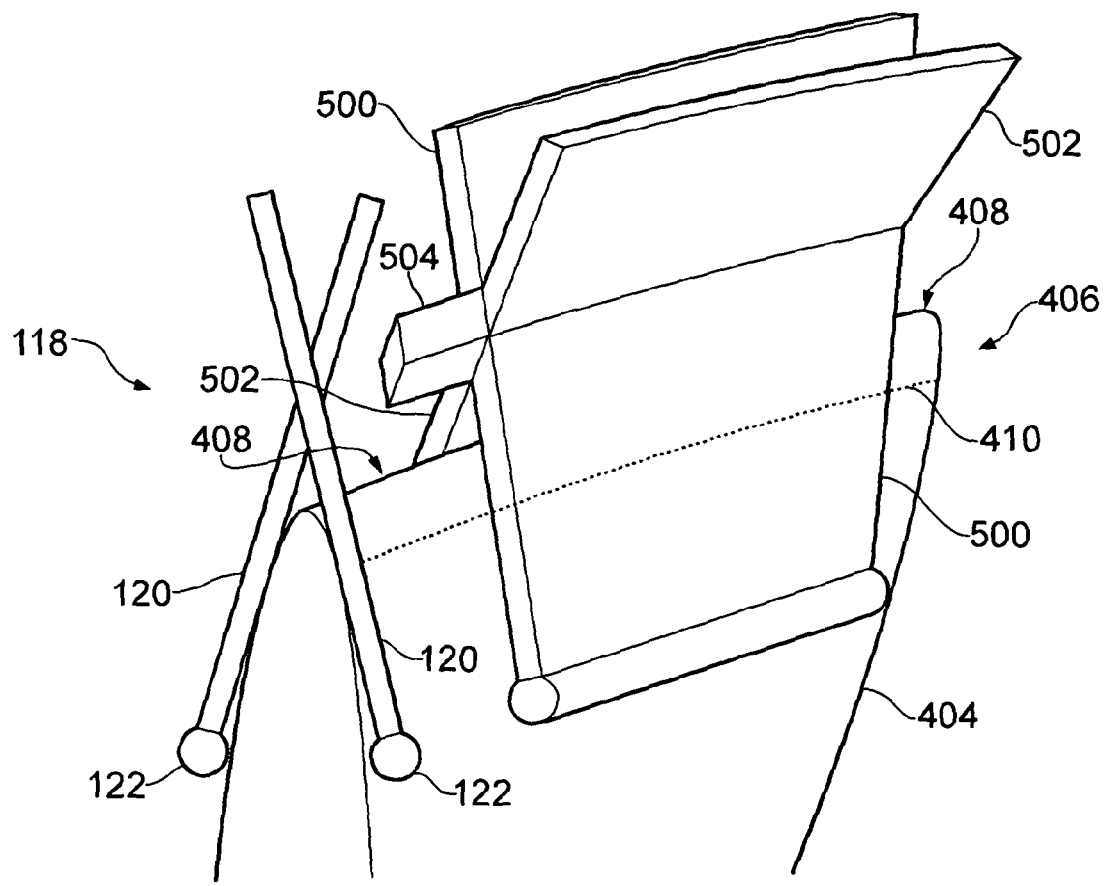
FIG. 4 is a schematic illustration of first and second series of measurements of a blade obtained via the method of the invention using a stylus with a cylindrical shaft.

Each of these steps will now be described in more detail with reference to FIG. 4. FIG. 4 shows a partial view of a single blade 404 (shown in isolation for the sake of simplicity) having a leading edge 406. Obtaining the first series of measurements at step 302 comprises taking a series of measurements alongside the edge's 406 apex using the stylus' 118 shaft 120. As will be understood, in the embodiment described this involves obtaining measurement information about the position of the probe from the CMM 100 (e.g. via encoders monitoring the position of the various parts of the gantry) including orientation information from the probe head 114, and stylus deflection data from the probe 116 itself. In particular, the shaft 120 of the stylus 118 is scanned along the length of the blade 404 on one side of the edge's apex 408 (the scanning path is illustrated by dashed line 410). As will be understood, it is not known at what point along the length of the shaft 120 contact has occurred—it is only known that contact between the blade 404 and shaft 120 has occurred at some point. Accordingly, rather than a specific point being recorded at each measured point along the length of the edge, a range of possible points of contact between the blade 404 and shaft 120 are recorded, thereby providing a first measurement volume, part of which is illustrated in FIG. 4 as first measurement volume 500. The angle of the stylus 118 relative to the blade 404 is then changed and this process is repeated (at step 304) on the opposing second side of the edge's apex 408 to obtain a second measurement volume, again part of which is illustrated in FIG. 4 as measurement volume 502. These first and second measurement volumes are determined from knowledge of the shape and dimensions of the shaft 120 (e.g. from CAD model data) and also location information determined from the various position encoders provided on the various axes of the CMM and head 114.

As shown in FIG. 4, the first 500 and second 502 measurement volumes overlap and intersect with other, thereby defining an intersection volume 504 (which extends all the way along the overlapping regions of the first and second measurement volumes—in FIG. 4 the intersection volume 504 is shown extending from the overlapping regions for ease of visualisation). In the embodiment described, the first and second measurement volumes totally overlap with each other along the length of the edge 406. That is the first and last range of possible points of contact in each of the first and second measurement volumes are taken at the same longitudinal point along the length of the blade. However, this need not necessarily be the case, and the first and second measurements could only partially overlap. For example, the first (and/or indeed the last) range of points of possible contact in the first volume and in the second volume might be taken at different longitudinal points along the length of the blade. This is the case, for instance, illustrated and described below in connection with FIG. 14. In that case, the first and second measurement volumes would only intersect for that region in which they overlap along the length of the object.

At step 306, the intersection volume 504 is then used to determine the location of the edge 408. In a particular embodiment, a line of intersection between the first 500 and second 502 measurement volumes along the length of the blade's edge is found. As will be understood, such a line of intersection will be offset from the actual edge of the blade. The true actual offset is not known because the actual precise dimensions, location and orientation of the blade is not yet known. Indeed, this is what is yet to be measured. For this reason, an ideal offset is used, this being an approximation of the true offset. This ideal offset can be the offset that would exist if the blade is an ideal blade according to a predetermined computer model, and accordingly the ideal offset can be found from data describing the ideal blade and also the stylus used to measure the blade.

The difference between the ideal offset and the true offset depends on the way in which the blade differs from the ideal. Four cases are described below to illustrate this.

Figure 8:
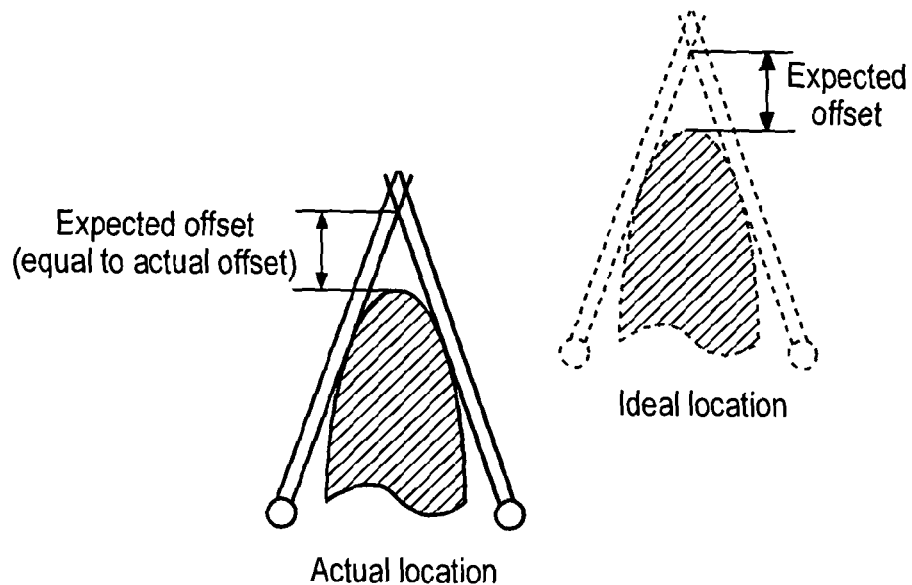

FIG. 8 illustrates the situation in which the blade is translated relative to its ideal location. The ideal blade location is shown in dashed-outline, together with the stylus locations from the test scans were they to be done on this ideal blade. The true location of the blade is also shown in solid-outline, together with the true stylus locations from the actual first and second measurements. Since the only difference between the actual and ideal blade is its location, the true and ideal offsets are the same. Accordingly, applying the ideal offset to the line of intersection derived from the first and second measurements exactly locates the true edge of the blade.

Figure 9:
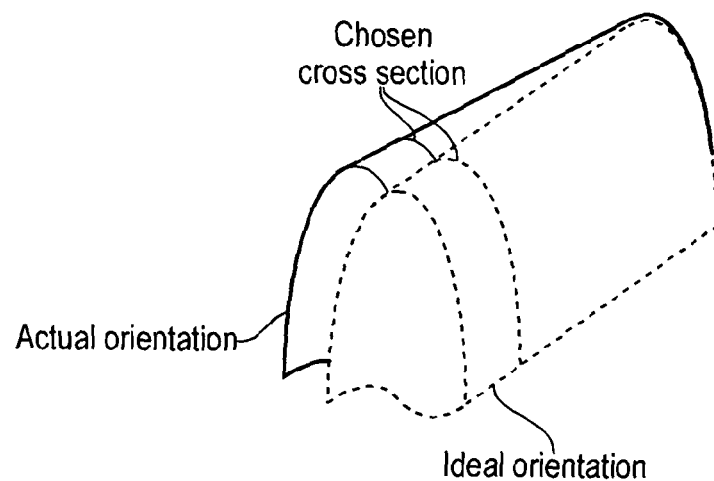

FIG. 9 shows the situation when the blade is rotated relative to its ideal location about an axis perpendicular to the edge of to be measured. At any chosen cross-section along the edge, this case can be considered to be identical to the situation described and illustrated above in connection with FIG. 8. Accordingly, the true location of the edge can be located along its length.

Figure 10:
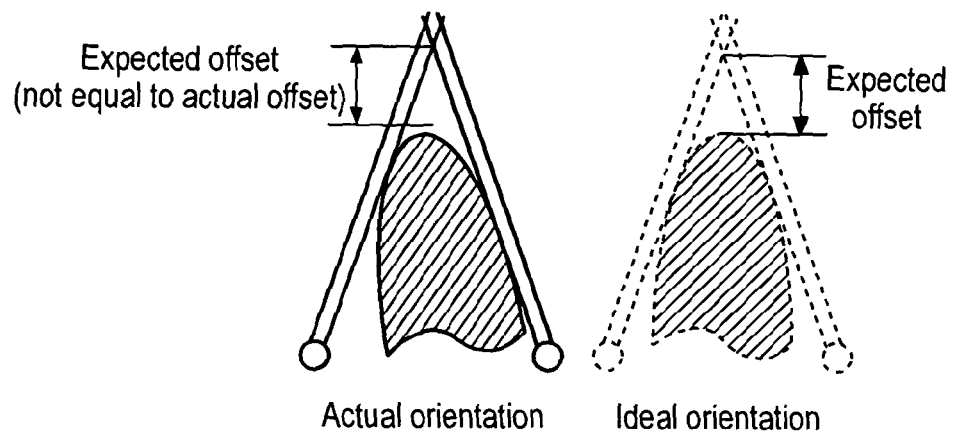

FIG. 10 shows the situation when the blade is rotated relative to its ideal location about an axis parallel to the edge to be measured. As before, the ideal and actual blade locations are shown, together with the ideal and actual stylus locations. In this case, applying the ideal offset may result in a small error in the location of the true edge of the workpiece.

Figure 11:
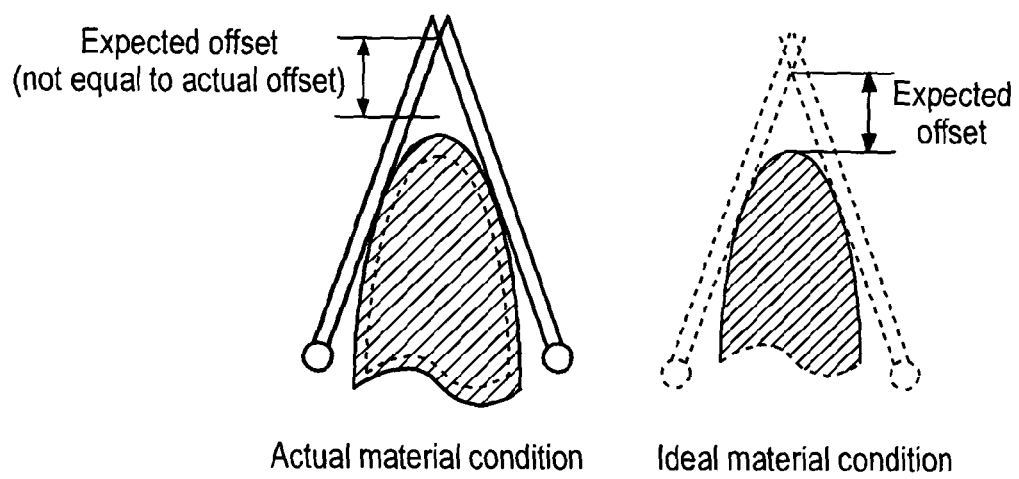

FIG. 11 shows the situation when the material condition of the blade is poor, e.g. the dimensions of the workpiece differ from the ideal dimensions. In this case, applying the ideal offset may result in a small error in the location of the true edge of the workpiece.

As will be understood from FIGS. 10 and 11, the above described method may result in small errors in determining the location of the true edge of the workpiece. However, this is acceptable because all that is to be determined at this stage is the approximate location of the edge so that this can be used to guide the actual measurement of the edge in a subsequent step. Even in the cases illustrated in FIGS. 10 and 11 you are in a better position having used the method of the invention because it provides you with more information about the location of the edge than if no such edge locating steps had been taken. In particular, it enables information about the surface normals, which the stylus is to be driven into in a subsequent scanning step, to be determined so as to ensure that any subsequent scanning step is successfully performed.

Once the approximate location of the edge 406 has been determined, it is then possible to perform an accurate measurement of the edge feature at step 308. For example, this can involve controlling the stylus 118 to scan the stylus tip 122 along the length of the edge 406 as it sweeps back and forth across the edge's apex 408 as illustrated in FIG. 5. This scan data can then be stored and/or used in subsequent processes, e.g. to analyse the certain properties of the blade's 404 edge 406, such as its precise location and/or form. As will be understood other techniques can be used during the subsequent measurement of the edge. For instance, a number of discrete scans about the edge's apex can be performed at different points along the length of the edge.

As will be understood, the computer 200 can store the instructions for such a method and issue commands to the controller 102 which in turn controls the motors on the various appropriate parts of the CMM 100 to move the probe 116. Furthermore, the controller 102 will receive position data from the various encoders on the CMM 100 and also stylus deflection data from the probe 116. The controller 102 passes this data to the computer 200 which uses the data to (at steps 302 and 304) form the first 500 and second 502 measurement volumes, and subsequently process them (at step 306) to locate the edge. The computer 200 also then at step 308 generates a suitable measurement path using the located edge and again issues instructions to the controller 102 to effect the measurement of the edge at step 308. Again, the controller 102 duly controls the motors on the various appropriate parts of the CMM 100 to move the probe 116 to measure the edge according to the instructions received from the computer 200. Furthermore, the controller 102 will again receive position data from the various encoders on the CMM 100 and also stylus deflection data from the probe 116, which it passes to the computer 200. As described above, the computer 200 can store the measurement data and/or use it in subsequent processes, e.g. to analyse the certain properties of the blade's 404 edge 406, such as its location and or form.

In the described embodiment, the more accurate measurement of the edge at step 308 is performed by the same probe 116 and stylus 118 that obtained the first 500 and second 502 measurement volumes at steps 302 and 304. In particular, this involves using the calibrated stylus tip 122 to scan the edge. This could be done for instance by scanning the stylus tip 122 back and forth across the apex 408 of the edge as the stylus tip 122 is moved along the length of the edge 406 (as illustrated by the stylus tip path 130 in FIG. 5). Alternatively, for example, and as described above, this could be done by taking a number of measurements of the edge (by sweeping the probe across the blade's apex 408) at discrete locations along the length of the blade's edge.

As will be understood, the probe that is used for the accurate measurement of the edge at step 308 need not necessarily be the same as that used to obtain the first and/or second measurements during steps 302 and 304. Indeed, a completely different type of probe and/or stylus could be used. For instance, a touch-trigger probe could be used at step 308 to obtain the measurement volumes along the edge, on either side of the edge's apex. In another embodiment a non-contact probe could be used to perform the measurement at step 308.

In the embodiment described above, the stylus 118 has a cylindrical shaft 120. However, as will be understood, this need not necessarily be the case and the invention can be implemented with shafts of other shapes. For example, FIGS. 6a and 6b respectively illustrate first 510, 520 and second 512, 522 series of measurement obtained using trumpet-shaped 150 and conical 152 shafts (the stylus tips have been omitted although as will be understood, the stylus could well include a stylus tip), and the intersection volume 514, 524 obtained using such shaped shafts. As will be understood, the intersection volume 514, 524 can be used in the same manner as described above to find the blade's edge 406.

Furthermore, in the above described embodiments the first and second measurement volumes are obtained using the same probe and stylus. However, this need not necessarily be the case. For instance, the probe 116 and/or stylus 118 loaded on the probe head 114 could be changed between obtaining the first and second measurement volumes. Indeed, the length and/or shape of the stylus shaft used to obtain the first measurement volume could be different to that used to obtain the second measurement volume.

In the above described embodiments, the relative orientation of the stylus 118 and blade 404 is changed between obtaining the first 500 and second 502 measurement volumes. However, this need not necessarily be the case, for instance, as illustrated in FIG. 7, the shape of the stylus shaft 152 (in this embodiment conical) enables the first and second measurement volumes (not visible in FIG. 7) to be obtained without reorienting the stylus 118.

In the above described embodiments, the first measurement volume 500 is obtained on a first side of the edge's apex 408 and the second measurement volume 502 is obtained on a second side of the edge's apex 408. However, this need not necessarily be the case. For instance, as illustrated in FIGS. 12a and 12b, the first 530 and second 532 measurement volumes can be obtained on the same side of the edge's apex 408. This still provides an intersection volume 534. This embodiment can be particularly useful for locating the translational position of the edge when the rotational orientation of the blade is known.

In the above described embodiments, the first and second series of measurements comprise first 500 and second 502 measurement volumes. However, this need not necessarily be the case. For instance, with reference to FIG. 13 the first and second series of measurements could comprise first 600 and second 602 measurement "bands" or "ribbons". In this embodiment, knowledge of the location of the shaft's 120 axis is used instead of its outer shape in order to generate the measurement data in the series of measurement. Accordingly, in this embodiment, the first 600 and second 602 measurement bands intersect along a line 604. This line of intersection can be used in the same way as described above to identify the location of the edge.

As will be understood, although the first and second series of measurements intersect, this need not necessarily mean that individual ranges of possible points of contact within the first series of measurements intersect with individual ranges of possible points of contact within the second series of measurements. For instance, as shown in FIG. 14 three distinct ranges of possible points of contact have been obtained at discrete locations along the length of the edge (e.g. having been obtained by a touch trigger probe, or from the output of a scan of the edge using an analogue scanning probe) on a first side of the edge forming a first series of measurements (illustrated by the bounding box 600). To aid illustration, FIG. 14 has been marked up to show that these three measurement ranges were taken at cross-sectional positions (b), (d) and (f) along the length of the blade. These three discrete ranges of possible points of contact are illustrated via short-dashed lines 606. Furthermore, three ranges of possible points of contact have been obtained at discrete points along the length of the edge (e.g. having been obtained by a touch trigger probe) on a second side of the edge forming a second series of measurements (illustrated by the bounding box 602). These three discrete ranges of possible points of contact are illustrated via long-dashed lines 608. To aid illustration, FIG. 14 has been marked up to show that these three measurement ranges were taken at cross-sectional positions (a), (c) and (e) along the length of the blade. As can be seen, no one individual measurement range obtained in the first series of measurements intersects with an individual measurement range obtained in the second series of measurements. Nevertheless, the first and second series of measurements (defined by these discrete measurement ranges of possible points of contact) overlap and intersect between the points (b) and (e) along the length of the blade. (The line along which the first and second series of measurements intersect is illustrated by line 604). Accordingly, in this case measurement ranges within each series can be extrapolated to common longitudinal positions along the length of the blade so as to find their point of intersection between the first and second series of measurements.

Furthermore, in the above described embodiments, the edge is found by applying an "ideal offset" from a point (or line) of intersection between two measurements (or series of measurements). However, there are other ways of locating the edge using the measurement data. For instance, best-fitting methods can be used to locate the edge. For instance, with reference to FIG. 15(a) the volumes (or for example centre line) traced out by the shaft can be input to an algorithm that performs a best fit to a computer model of the blade, based on the constraint that the model must contact the volumes. The best-fit algorithm may optimise the position and orientation of the model in any or all of its six degrees of freedom. It may also take into account possible variations in material condition from the ideal material condition of the computer model. Such best fitting algorithms are known to those skilled in the art, and are founded a branch of mathematics known as optimisation. As will be appreciated, the more data that can be provided to the algorithm, the better the fit is likely to be. Hence it may be desirable to scan the blade edge with the stylus in a variety of orientations and for example FIG. 15(b) shows the volumes traced out if three scans are done.

In the above described embodiments, first and second series of measurements intersect each other. However, this need not necessarily be the case; for example if a best-fitting method is used to determine the location of the edge using the first and second series of measurements. For example, with reference to FIG. 14, a best-fitting algorithm could be used to determine the location of a straight edge from just measurements obtained two points, e.g. points (a) and (f), which individually do not intersect with each other.

In the described embodiments, the first and second series of measurements are described as having been obtained by performing two discrete measuring procedures, e.g. two discrete scans of the blade. However, this need not necessarily be the case. For instance, the first and second series of measurements could be obtained by performing one continuous scan of the blade, which comprises at least one cycle of scanning the probe along the length of the blade in one direction and then back along the length of the blade in the other direction. As will be understood, the position/orientation of the probe and blade could be changed in discrete steps and/or continuously.

In the above described embodiments, the approximate shape and/or size of the feature to be located was assumed. However, this need not necessarily be the case. For instance, the measurements can be used to find the shape and/or size of a part of substantially unknown shape and/or dimensions (commonly referred to as "unknown part scanning"). Although each measurement of the part will have a range of possible points of contact, the multiple measurements can be used to identify which are possibly valid and which are definitely invalid points of contact and hence enable a picture or model of the feature to be built up from the multiple measurements. The points at which the different measurements cross or intersect can define the border between valid and invalid points of contact. Accordingly, the valid points of contact can comprise a subset of the possible points of contact of each of the different measurements. For instance, referring to FIG. 15(a), from just those two measurements, it can be determined that the cross-sectional shape and size of the object has to be a shape that can be contained within the triangular region between the two measurements, that is the boundary defined by the valid points of contact. Referring to FIG. 15(b), it can be seen that adding another measurement adds more information that can be used to determine the actual shape of the object. As will be understood, the more measurements obtained the higher resolution shape and size information about the object that can be obtained. Such a method could be implemented by taking a number of discrete points about the feature, e.g. using a touch trigger probe. As will be understood, such a method could be performed using an analogue scanning probe. For instance, the analogue scanning probe could be dragged across the feature at one point along the length of the feature. Optionally, the method could comprise scanning the stylus shaft along the feature a plurality of times (e.g. back and forth) at different angles between the stylus shaft and the feature (e.g. about an axis extending along the length of the feature).

FIG. 15(c) illustrates such a method in which the analogue scanning probe has been swept along the length of the blade at five different angular orientations; FIG. 15(c) illustrates the position of the blade at one point along the length of the blade for different sweeps along the blade. This could have been achieved for example by performing a number of discrete sweeps at different angular orientations or, for instance, by essentially rubbing the shaft back and forth along the length of the blade in continuous contact with the blade (the angular orientation could be changed at the end of each pass or for instance could be changed continuously). As can be seen this provides a far greater number of measurements for each point along the length of the blade and thereby enables the range of valid points of contact to be reduced to something which more accurately resembles the actual shape of the feature. That is the boundary, or outline, defined by the valid points of contact for the five different measurements has a shape closely resembling that of the blade's edge.

Although the above described technique of locating the artifact and determining its shape and size based on determining the valid points of contact from a number of different scans can be used is described with respect to scanning unknown parts, as will be understood such techniques can be used even when the nominal shape of the artifact to be measured is known. In this case the nominal model of the artifact could be used to determine the relative course of motion of the analogue scanning probe and artifact. The measured dimensional/shape data which is based on (e.g. corresponds to) the valid scan points, can be compared to the expected nominal model to determine any deviations from the nominal model. There are various appropriate ways of recording the measurement data obtained from a probe in order to implement the invention. For instance, in many of the above described embodiments, it is implied that stylus volume data is recorded for a series of positions along the scan. Actual volume data could be recorded, or alternatively data relating to the probe from which volume data can be determined could be recorded. For instance, the stylus position and stylus orientation information could be recorded. In particular, for example, the stylus orientation information could be recorded in the form of the angle(s) of the rotatable part(s) of the articulated head on which the probe is mounted. The stylus orientation information could be recorded as a vector. The stylus position could be determined from a recorded stylus tip position. Optionally, the quill position and stylus tip offset position information could be recorded.

In the described embodiment, the coordinate positioning machine is a serial CMM (i.e. in which the three linear degrees of freedom is provided by three independent, orthogonal axes of motion). However, as will be understood, the invention can also be used to control the movement of other types of coordinate positioning machines, such parallel CMMs, robot arms or the like. The invention can also be used with not just dedicated CMMs, but also coordinate positioning machines such as machine tools. Furthermore, as will be understood, the invention is also suitable for use with Cartesian and non-Cartesian positioning machines, such as polar and spherical coordinate positioning machines.

In the above described embodiments, the probe is moved and/or reoriented relative to the part which is held is a fixed position. However, as will be understood, this need not necessarily be the case and for instance the part could be moved/ re-oriented as well as or instead of the head. For example, the part could be mounted on a sliding and/or rotary table.

The above described embodiments are with respect to a blade of a blisk. However, as will be understood, this need not necessarily be the case and as will be understood the invention is equally applicable to other types of features and artifacts.

The invention claimed is:

1. A method of locating a feature of an object comprising: bringing a stylus of a contact probe mounted on a positioning apparatus into contact with the object to obtain at least first and second measurements of the object, each of which gives rise to a range of possible points of contact between the object and a part of the stylus along its length and therefore inherently containing uncertainty in the location of the object along said length, and using the at least first and second measurements to at least reduce the extent of said uncertainty comprising using known stylus orientation related information associated with the at least first and second measurements.

2. A method as claimed in claim 1, in which the contact probe used to obtain the second measurement is the same as that used to obtain the first measurement.

3. A method as claimed in claim 1, in which the relative angular orientation between the contact probe and the object is different for the first and second measurements.

4. A method as claimed in claim 1 in which the stylus comprises a stylus shaft and a stylus tip and in which at least one of the first and second measurements is obtained by bringing the stylus shaft into contact with the object.

5. A method as claimed in claim 4, in which at least the part of the stylus shaft to be brought into contact with the object is substantially circular in cross-section.

6. A method as claimed in claim 1, the method comprising subsequently using said identified location of the feature to guide the measurement of at least a part of the feature with a measurement probe.

7. A method as claimed in claim 4, in which the stylus tip is used to measure the at least part of the feature.

8. A method as claimed in claim 6, in which the measurement probe used to subsequently measure the at least part of the feature is the same probe used to obtain at least one of the first and second measurements.

9. A method as claimed in claim 1, in which the first measurement is taken on a first side of the feature, and the second measurement is taken on a second side of the feature.

10. A method as claimed in claim 1, in which the method comprises obtaining a series of first measurements on the first side of the feature and a series of second measurements on the second side of the feature.

11. A method as claimed in claim 10, in which at least one of said first and second series of measurements is obtained by scanning the contact probe along the length of the feature.

12. A method as claimed in any claim 10, in which the first and second series of measurements intersect and in which the intersection of the first and second series of measurements is used to identify the location of at least part of the feature.

13. A method as claimed in claim 1, in which the location of the feature is identified by fitting a model of at least a part of the object to the first and second measurements.

14. A method as claimed in claim 1, in which the feature is an edge of an object, preferably the edge of a blade.

15. A method as claimed in claim 1 in which said at least first and second measurements intersect and in which reducing the extent of said uncertainty comprises based on said points of intersection refining the range of possible points of contact for the at least first and second measurements down to a range of valid points of contact and determining the shape and/or dimensions of at least a section of the feature based on said range of valid points of contact.

16. An apparatus for locating a feature of an object, comprising a contact probe having a stylus mounted on a coordinate positioning apparatus, in which the apparatus is configured to bring the stylus of the contact probe mounted on a positioning apparatus into contact with an object to obtain at least first and second measurements of the object, each of which gives rise to a range of possible points of contact between the object and a part of the stylus along its length and therefore inherently containing uncertainty in the location of the object along said length, and configured to use the at least first and second measurements to at least reduce the extent of said uncertainty by using stylus orientation related information associated with the at least first and second measurements.

* * * * *